United States Patent [19]
Kiya et al.

[11] Patent Number: 5,170,339
[45] Date of Patent: Dec. 8, 1992

[54] CONTROL SYSTEM FOR PROGRAMMABLE CONTROL DEVICE

[75] Inventors: Nobuyuki Kiya, Hachioji; Yasushi Onishi, Minamitsuru, both of Japan

[73] Assignee: Fanuc Ltd., Minamitsuru, Japan

[21] Appl. No.: 798,051

[22] Filed: Nov. 27, 1991

Related U.S. Application Data

[63] Continuation of Ser. No. 415,350, Sep. 7, 1989, abandoned.

[30] Foreign Application Priority Data

Jan. 29, 1988 [JP] Japan ................................ 63-18604

[51] Int. Cl.⁵ .......................... G05B 19/00; G06F 9/00
[52] U.S. Cl. .............................. 364/147; 364/DIG. 2; 364/926.9; 364/949
[58] Field of Search ............................... 364/140-147, 364/DIG. 2

[56] References Cited

U.S. PATENT DOCUMENTS

| | | | |
|---|---|---|---|
| 4,441,161 | 4/1984 | Sasaki et al. | 364/147 X |
| 4,488,258 | 12/1984 | Struger et al. | 364/900 |
| 4,858,101 | 8/1989 | Stewart et al. | 364/474.11 X |

Primary Examiner—Joseph Ruggiero
Attorney, Agent, or Firm—Staas & Halsey

[57] ABSTRACT

A control system for a programmable control device (10) executing a user program cyclically, wherein a data bit is provided in a memory space which can be accessed by a user program, the data bit is made "ON" in an operation mode and made "OFF" in a stop mode. The data bit is programmed with an AND condition for an output signal (Q1) to be made "OFF" in the stop mode, and the operation mode is shifted to the stop mode only after having made the data bit "OFF" and having executed the user program for one or more scans.

7 Claims, 4 Drawing Sheets

CONTROL SYSTEM FOR PROGRAMMABLE CONTROL DEVICE

This application is a continuation of application Ser. No. 07/415,350, filed Sep. 7, 1989, now abandoned.

BACKGROUND OF THE INVENTION

A. Field of the Invention

The present invention relates to a control system for a programmable control device (PC) which executes a user program cyclically, and more specifically, to a control system for a PC device permitting output signal conditions in a stop mode to be arbitrarily programmed by a user program.

b. Description of Related Art

The operation conditions of a PC device include an operation mode and a stop mode. Usually, all of the output signals are compulsorily turned off in the stop mode. Sometimes, however, an output signal must remain in the same condition in the operation mode, depending on the character of the signal, when the PC device is in the stop mode. For example, a signal effecting a mechanical operation when in an "ON" state must be turned "OFF" in the stop mode. On the other hand, preferably an output signal controlling a clamp mechanism and the like is kept in the "ON" state in the stop mode.

In a known PC device control system, parameters are provided by which all output signals or a part of thereof can be turned "OFF" or kept in their previous state, in a stop mode. In such a system the above conditions are set by using a plurality of parameters. However, an increase in the number of signals means that the number of parameters to be set must be increased, and thus it becomes difficult to set a parameter for each signal. Further, to ensure a required operation of the PC device, the parameters must be correctly set, in addition to the creation of a program, by the user.

SUMMARY OF THE INVENTION

Taking the above problems into consideration, an object of the present invention is to provide a control system for a PC device by which output signal conditions in a stop mode cna be arbitrarily programmed by a user program.

Therefore, in accordance with the present invention, there is provided a control system for a programmable control device (PC) which executes a user program cyclically. The system performs the steps of providing data bits in a memory space which can be accessed by the user program, making the data bits "ON" in an operation mode and "OFF" in a stop mode, programming the data bits with an AND condition for an output signal to be made "OFF" in the stop mode, and shifting the operation mode to the stop mode after having made the data bits "OFF" and having executed the user program for one or more scans.

The data bits provided in the memory space are programmed with the AND condition for the output signal to be turned "OFF" in the stop mode, the data bits are first made "OFF" to make a corresponding output "OFF", and then the operation mode is shifted to the stop mode.

DESCRIPTION OF THE PREFERRED EMBODIMENT

An embodiment of the present invention will be described in detail with reference to the drawings.

Figure 1:
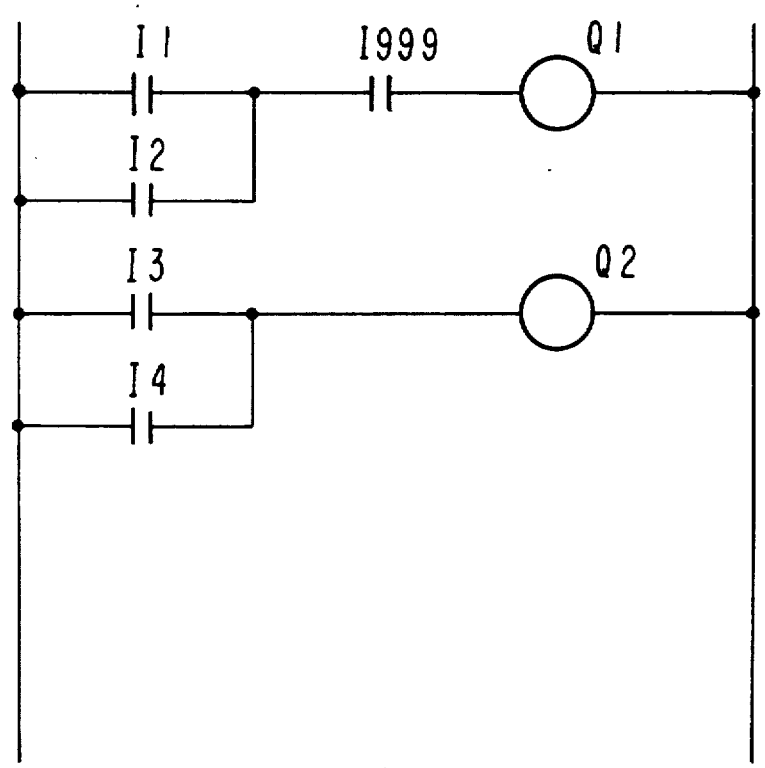
FIG. 1 is a diagram of a user program using the present invention.
Figure 2:
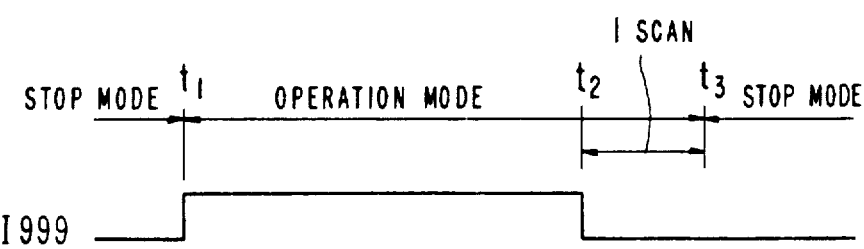
FIGS. 2A-2G constitute a timing chart of the operation of signals.

FIG. 1 is a ladder diagram of the embodiment of the present invention showing an example, wherein I1, I2, I3, and I4 designate input signals and Q1 and Q2 designate output signals. Here, the output signal Q1 is to be made or turned "OFF" when the PC device (programmable controller) shifts from an operation mode to a stop mode. Conversely, the output signal Q2 is to be held in the previous state thereof at that time.

Designated at I999 is an output control signal which makes the output signal Q1 "OFF" when the PC device is shifted from the operation mode to the stop mode. The output control signal I999 is programmed with an AND condition for the output signal Q1. Therefore when the operation mode is to be shifted to the stop mode, the control signal I999 is made "OFF" and a logical process for a scan is once executed. As a result, the output signal Q1 is made or turned "OFF" to shift the operation mode to the stop mode. This control is processed by a management program stored in a read-only memory (ROM) of the PC device.

Next, the shift from the operation mode to the stop mode will be described with reference to the timing charts shown in FIGS. 2A-2G, which are timing charts of the signals shown in FIG. 1.

The stop mode is terminated at a time $t_1$ when, for example, an operator depresses a start button to shift to the operation mode. Then at a time $t_2$, the operator, for example, depresses a stop button, to cause the PC device to make the signal I999 "OFF", and execute a logic process for one or more scans, and to shift to the stop mode at a time $t_3$.

As shown in FIGS. 2A-2G, since the output control signal I999 is programmed with the AND condition, the output signal Q1 is made "OFF" at the time $t_3$, after the logical process for the one scan has been executed. Conversely, the output Q2 is kept in the previous condition because the output control signal I999 was not programmed with the AND condition.

Figure 3:
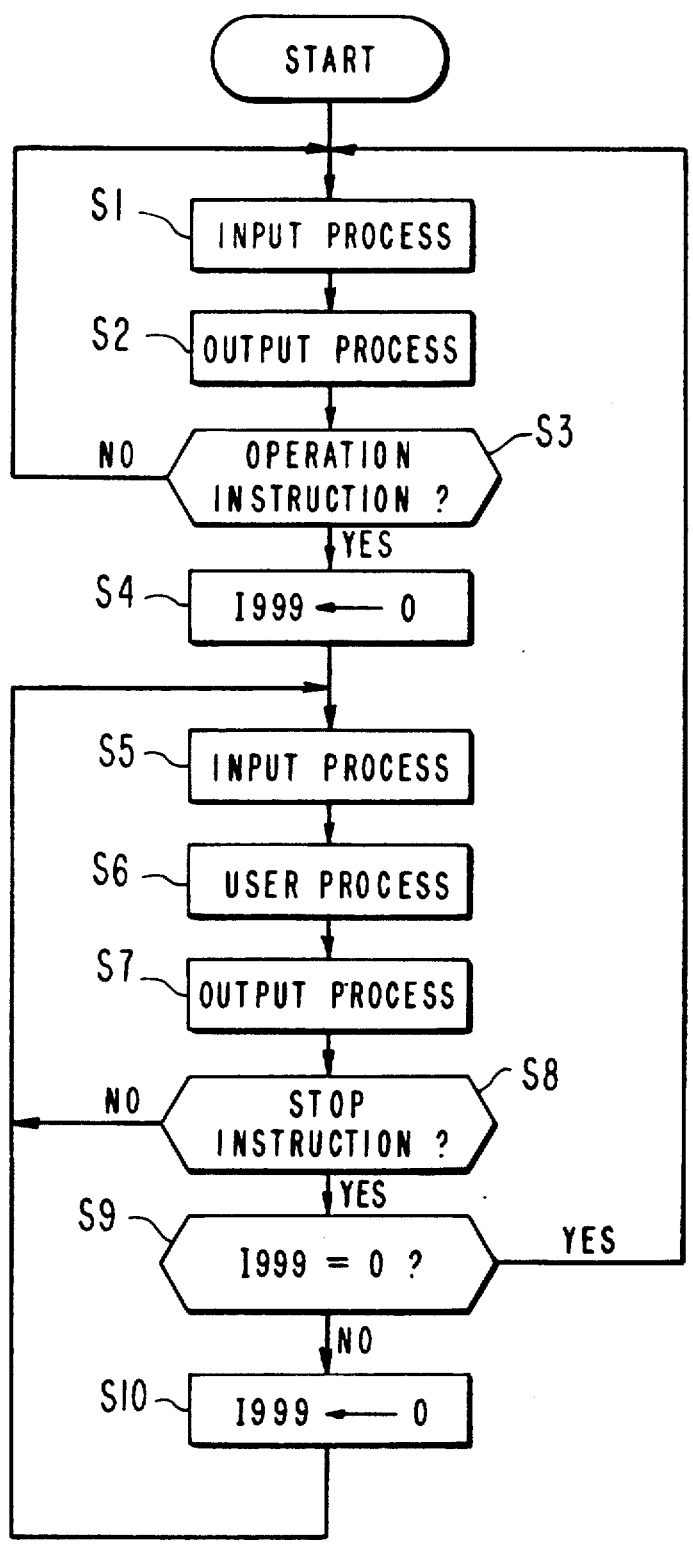
FIG. 3 is a flowchart of the process of a management program.

FIG. 3 is a flowchart of the process of a management program. In the figure, the number following "S" represents the step number.

[S1] An input process such as a reading of an input signal and the like is excuted.

[S2] An output process is executed.

[S3] It is determined if an operation instruction exists. If an operation instruction does not exist, the flow returns to step S1, but if an operation instruction does exist, the flow goes to step S4.

[S4] If the PC device is in an operation mode, the output control signal I999 is set to "1".

[S5] An input process such as a reading of an input signal and the like is executed.

[S6] A user program or a ladder program is executed.

[S7] A signal is output as a result of the execution of the ladder program.

[S8] It is determined whether a stop instruction exists. If a stop instruction does not exist, the flow goes to step S5 and the ladder program process is executed. If a stop instruction does exist, the flow goes to step S9.

[S9] It is determined whether the output control signal I999 is "0". If this signal is "0", the flow goes to step S1. If the signal is "1", the flow goes to step S10.

[S10] The output control signal I999 is set to "0", and the flow goes to step S5. When the signal I999 is set to "0", the user program for one scan is executed (S5, S6 ... S9) and the flow returns to step S1, to shift the operation mode to the stop mode.

Figure 4:
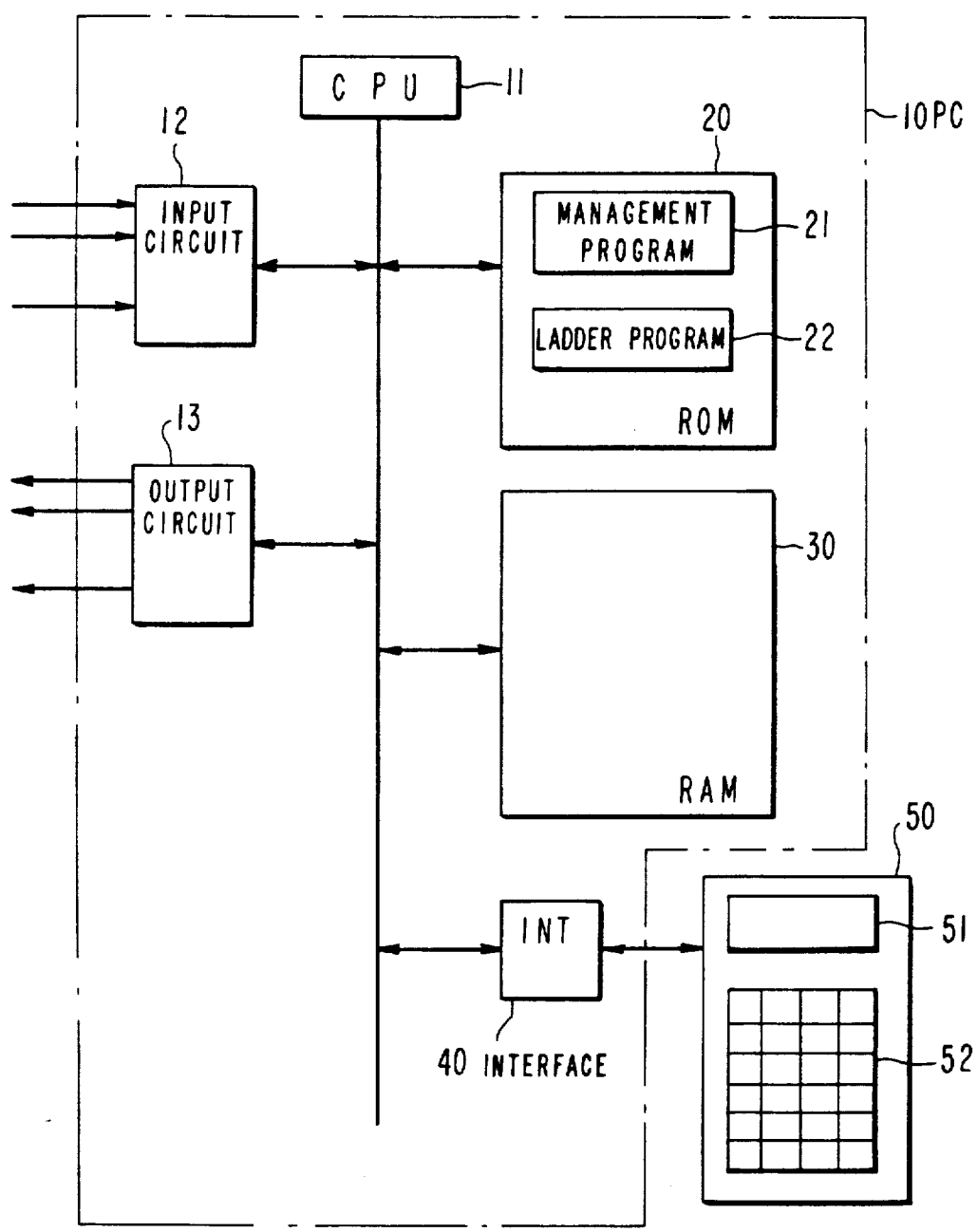
FIG. 4 is a block diagram of the hardware of a PC device as an embodiment of the present invention.

FIG. 4 is a block diagram of the hardware of a PC device as an embodiment of the present invention. As shown in FIG. 4, a processor (CPU) 11 exerts overall control of the PC device 10, an input circuit 12 receives external signals and transmit same to a bus after changing the level thereof, and output circuit 13 outputs internal signals to the outside.

A ROM 20 stores the management program 21, which manages the execution of a ladder program (control program), and the ladder program 22 for controlling a machine tool and the like, in addition to the input and output signals. An interface circuit 40 connects a programming unit 50 to the bus which is used to program and debug the ladder program 22. The interface circuit 40 comprises a liquid crystal display 51 and a keyboard 52. Although the above description is made with respect to a user program or a ladder program, a high level language such as a sequential function chart (SFC), PASCAL, and the like can be processed in the same manner.

According to the present invention, as described above, a data bit is provided and made or turned "ON" in an operation mode and turned "OFF" when the operation mode is shifted to a stop mode. The operation mode is shifted to the stop mode after the user program for one scan has been executed. Thus the output signal can be made or turned "OFF" by programming the user program with the data bit and the AND condition. Accordingly, it is not necessary to set a parameter to change a mode for each signal and thus setting errors and the like are eliminated.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

What is claimed is:

1. A cyclic scan control system for a programmable control device, wherein the programmable control device executes a user program cyclically, said control system comprising:
 storage means for storing a data bit in a memory space which can be accessed by the user program, the data bit having an "ON" state in an operation mode of the programmable control device and an "OFF" state in a stop mode of the programmable control device;
 means for programming the data bit with an AND condition for output signals which are to be set in the "OFF" state in the stop mode; and
 means for delaying the shifting of the operation mode to the stop mode until after the data bit is set in the "OFF" state and the user program is executed for at least one scan.

2. A cyclic scan control system for a programmable control device according to claim 1, wherein the user program is a ladder program.

3. A cyclic scan control system for a programmable control device according to claim 1, wherein the user program is a sequential functional chart.

4. A cyclic scan control system for a programmable control device according to claim 1, wherein the user program is a high level computer language.

5. A method for scan control of a programmable control device, wherein the programmable control device executes a user program cyclically and has an operation mode and a stop mode, said method comprising steps of:
 (a) storing a data bit in a memory space which can be accessed by the user program, the data bit having an "ON" state in the operation mode and an "OFF" state in the stop mode;
 (b) programming the data bit with an AND condition for output signals which are to be set in the "OFF" state in the stop mode; and
 (c) delaying the shifting from the operation mode to the stop mode until after the data bit is set in the "OFF" state and the user program is executed for at least one scan.

6. A method for cyclic scan control of a programmable control device, wherein the programmable control device cyclically executes a user program stored in a memory and has an operational mode and a stop mode, said method comprising the steps of:
 (a) reading an input control signal;
 (b) processing the input control signal;
 (c) determining whether an operation instruction is present;
 (d) returning to step (a) once said determining in step (c) determines that the operation instruction is not present;
 (e) setting an output control system to a first state;
 (f) reading an input control signal;
 (g) processing the input control signal;
 (h) determining whether the operation instruction is a stop instruction;
 (i) returning to step (f) when said determining in step (h) determines that the stop instruction is not present;
 (j) determining whether the output control signal is in a second state;
 (k) returning to step (a) when the output control signal is determined in step (j) to be in the second state; and
 (l) setting the output control signal to the second state and returning to step (f) when the output control signal is determined in step (j) to not be in the second state.

7. A method for scanning control of a programmable control device, wherein the programmable control device executes a user program cyclically and has an operation mode and a stop mode, said method comprising the steps of:
 (a) storing a data bit in a memory space which can be accessed by the user program, the data bit having an "ON" state in the operation mode and an "OFF" state in the stop mode;
 (b) programming the data bit with an AND condition for output signals which are to be set in the "OFF" state in the stop mode; and
 (c) delaying the shifting from the operation mode to the stop mode until the data bit is set in the "OFF" state.

* * * * *

UNITED STATES PATENT AND TRADEMARK OFFICE
CERTIFICATE OF CORRECTION

PATENT NO. : 5,170,339
DATED : December 8, 1992
INVENTOR(S) : Kiya et al.

It is certified that error appears in the above-identified patent and that said Letters Patent is hereby corrected as shown below:

- TITLE PAGE, insert at [63]

--CROSS-REFERENCE TO RELATED APPLICATIONS
    The present application is related to
    U.S. Patent Application Serial No.
    07/273,511--;

- Column 1, line 17, change "operation" to

--operating--;

- Column 1, line 30, after "part" delete "of".

Signed and Sealed this

Sixteenth Day of November, 1993

Attest:

BRUCE LEHMAN

*Attesting Officer*    *Commissioner of Patents and Trademarks*